Sept. 8, 1942.  P. W. SEEWALD  2,295,430
ADVERTISING DEVICE
Filed Feb. 12, 1940  3 Sheets-Sheet 1
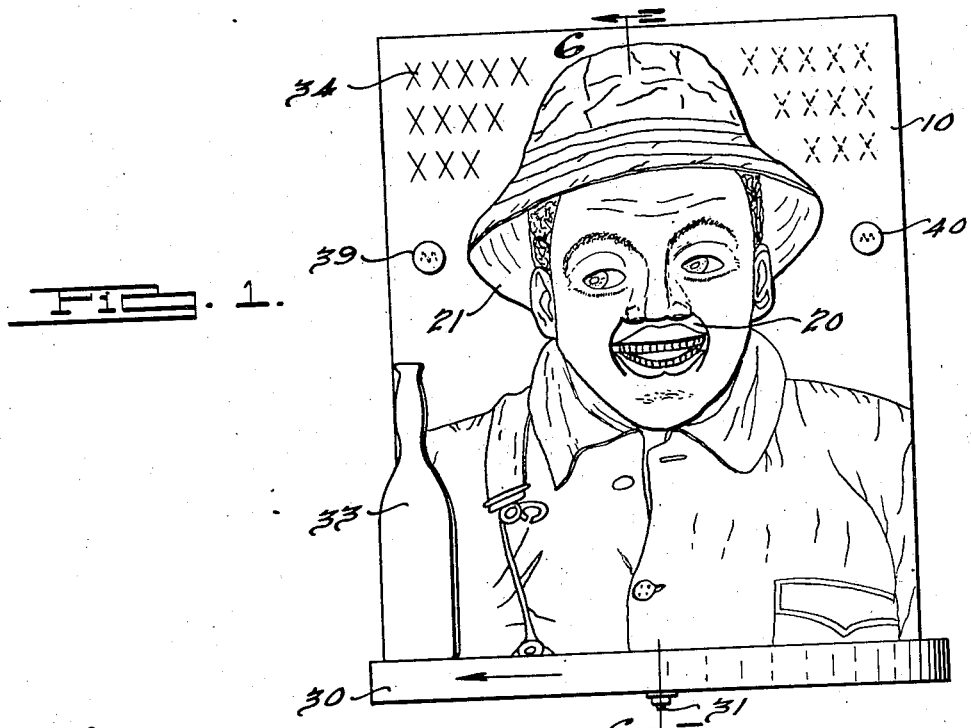
FIG. 1.
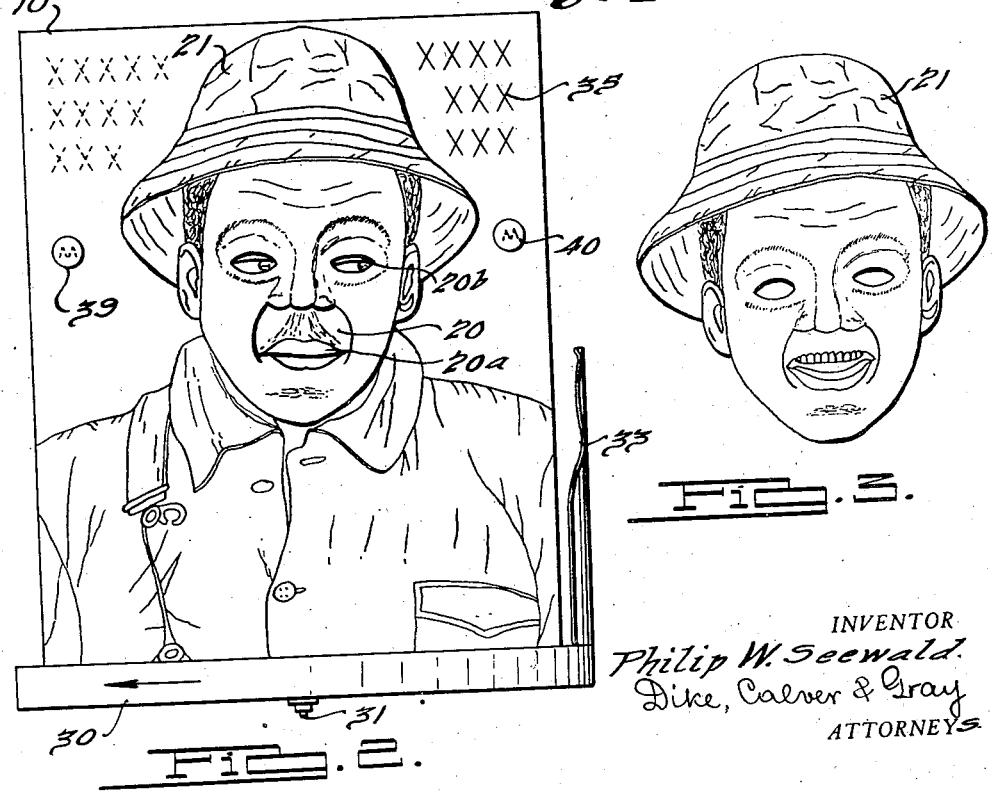
FIG. 2.
FIG. 3.
INVENTOR
Philip W. Seewald
Dike, Calver & Gray
ATTORNEYS

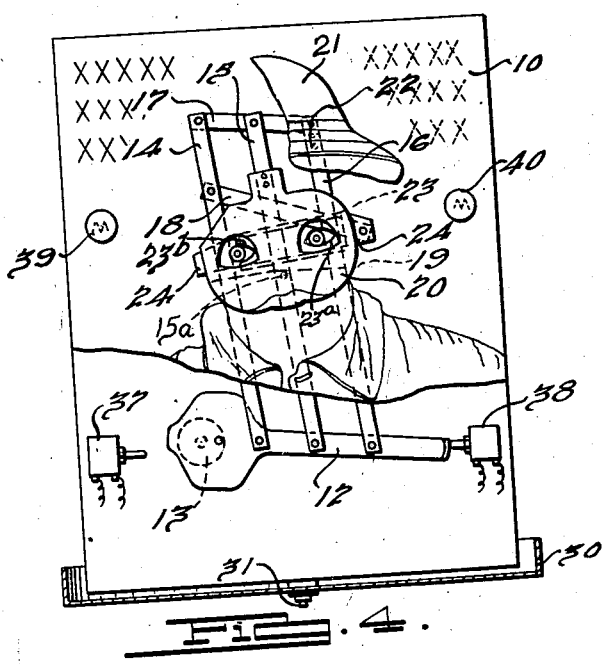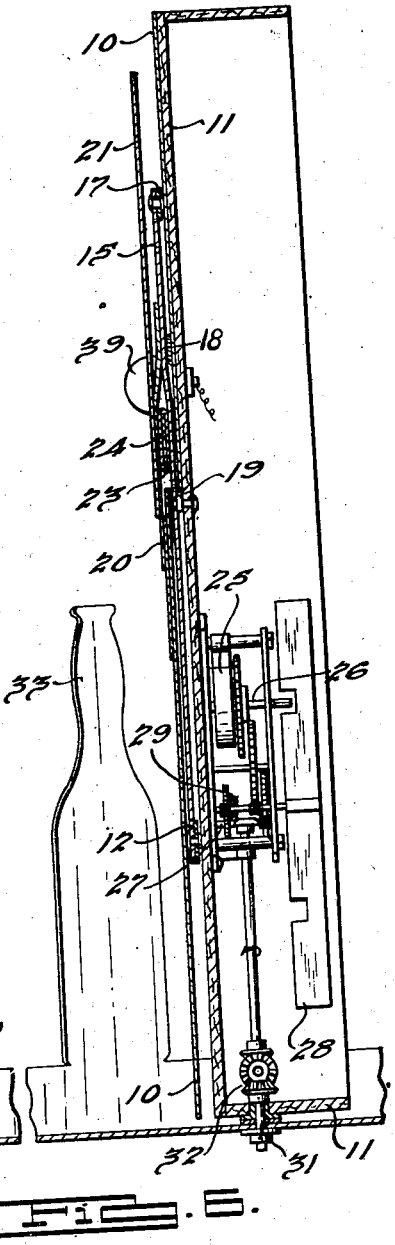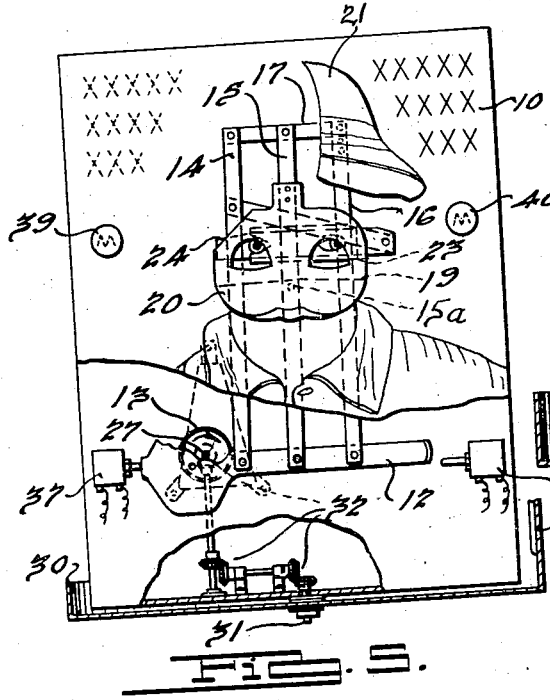

Sept. 8, 1942.  P. W. SEEWALD  2,295,430
ADVERTISING DEVICE
Filed Feb. 12, 1940    3 Sheets-Sheet 3
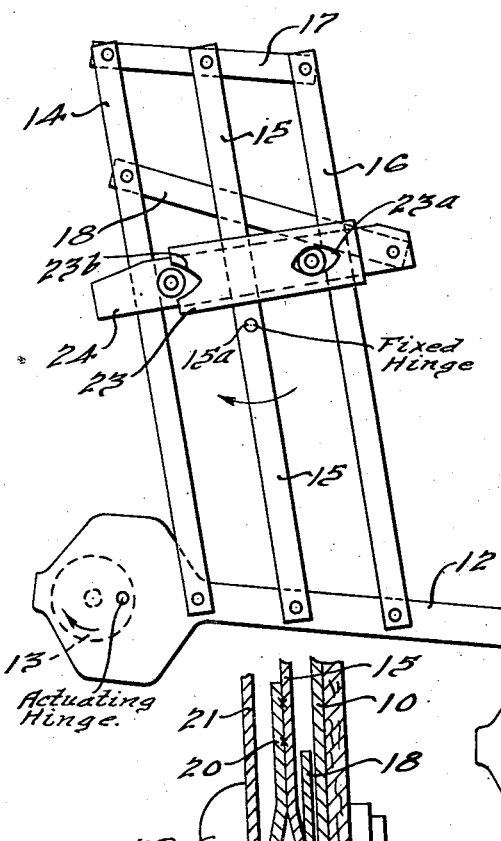
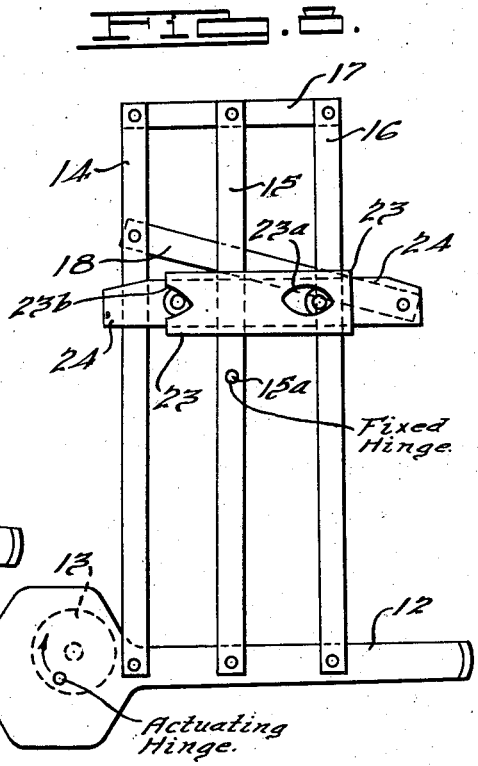
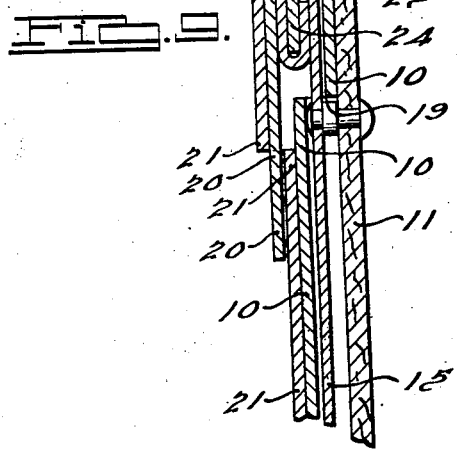
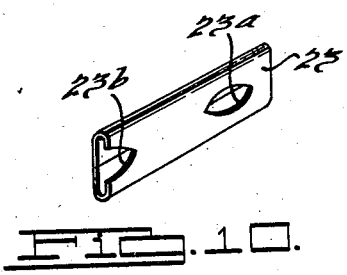
INVENTOR
Philip W. Seewald.
BY
Dike, Calvert & Gray
ATTORNEYS.

Patented Sept. 8, 1942

2,295,430

UNITED STATES PATENT OFFICE 2,295,430

ADVERTISING DEVICE

Philip W. Seewald, Clinton, Mich., assignor to John H. Gorsuch, Detroit, Mich.

Application February 12, 1940, Serial No. 318,512

4 Claims. (Cl. 40—139)

This invention relates to advertising devices and more particularly to such devices including animated signs.

One of the objects of the present invention is to provide an improved advertising device including an animated sign and a model of the advertised product, the movements in the animated sign and the movements of the model of the product being so synchronized as to convey to an observer a definite advertising message or idea.

Another object of the invention is to provide an improved advertising device of the above character in which the idea to be conveyed to an observer is strengthened by an appearing and disappearing letter message, the appearance and disappearance of which being synchronized and correlated with the movements in the animated sign and the model of the product.

A further object of the invention is to provide an animated sign representing a human figure, in which sign means are provided for changing relative positions of the parts of the figure and expressions of the face, and in which there are also provided improved means actuating a model of the product, said means being so synchronized or correlated with the animated sign actuating means that changes in the parts of the figure and in expressions of the face advantageously coincide with the position of the model of the product.

It is an added object of the invention to provide an improved structure of the above character, which is relatively simple in construction, dependable in operation, and which is relatively inexpensive to manufacture.

It is a further object of the invention to provide an improved linkage for operating animated signs smoothly and without jerky movements common in conventional structures.

Other objects and advantages of this invention will appear in the following description and appended claims, reference being had to the accompanying drawings forming a part of this specification, wherein like reference characters designate corresponding parts in the several views.

Fig. 1 is a front view of the advertising device embodying the present invention, said device being shown in the position when the advertised product appears and the face of the animated sign expresses joy.

Fig. 2 is a view similar in part to Fig. 1 showing the product disappearing and the face showing sorrow.

Fig. 3 shows the head and hat portion of the animated sign separately.

Fig. 4 shows the operative linkage in the position corresponding to Fig. 1.

Fig. 5 shows the operative linkage in the position corresponding to Fig. 2.

Fig. 6 is a vertical sectional view taken in the direction of the arrows on the section plane passing through line 6—6 of Fig. 1.

Fig. 7 illustrates the linkage of the device on an enlarged scale, the linkage being in the position shown in Fig. 4.

Fig. 8 is a view similar in part to Fig 7, the linkage being in the position shown in Fig. 5.

Fig. 9 shows on an enlarged scale the portion encircled in Fig. 6 by a circle indicated therein by the numeral 9.

Fig. 10 illustrates in perspective the frame piece 23.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown, by way of example, an advertising device embodying the present invention. The device herein illustrated and described includes an animated sign representing the upper portion of a human figure including a face, said sign being operable to change positions of the head and expressions of the face of the figure.

It will be specifically understood, however, that figures other than human may be used and any desired plurality thereof employed.

The desired expressiveness of the sign may be attained not only with the aid of changing facial expressions but also by changing relative positions of the parts of figures, as well as by changing relative positions of separate figures with respect to one another.

The advertised product is represented by a model of a bottle but any other model of any product may be used. When advertising devices are constructed for use on counters, an actual product, such as a bottle of soft drink or a package of merchandise may be used instead of the model.

Referring to the drawings, the advertising device illustrated thereby includes an animated sign picturing the upper portion of a human figure, namely, a boy dressed in a working shirt and a cap, however figures representing other human beings may as well be employed. The various elements of the face of the figure are proportioned and adapted to be moved relative to each other to alternately express joy and sorrow. The sign includes a base plate or sheet 10 on which there is printed, or painted, or represented by any other means the chest, the shoulder and the neck portions of a human figure. This portion is mounted on a suitable support such for example as a box 11 serving as a frame or base for the device. On the box 11 there is also operatively mounted a linkage comprising an arm 12 actuated by an eccentric 13. To the arm 12 there are hingedly secured vertically extending links 14, 15 and 16 hingedly connected together by a transverse link 17. To the vertical link 14 there is hinged an inclined link 18. The linkage is preferably pivoted on the base plate and the box as indicated at 15a.

The arm 12 and the lower portions of the vertical links 14, 15 and 16 are arranged under the base plate or sheet 10, while the upper portions of said vertical links pass through a slit 19 in said base sheet 10 and are arranged together with the links 17 and 18 on the top or in front of said sheet. To the vertical link 15 there is secured a lip-and-eyelid portion 20 provided with a lip 20a and eyelid portions 20b. The head portion which is integral with the hat is represented by the numeral 21, and it is secured as at 22 to the vertical link 16. An eye frame piece 23 having eye openings 23a and 23b is secured to the link 16 while the eye piece 24 having eye pupils provided thereon is hingedly secured by one of its ends to the link 18 and slides in said eye frame 23.

Because of the character of the linkage, movements of the arm 12 caused by rotation of the eccentric 13 produce different linear movements of various points of the links and, therefore, of the described face and head portions. The character and the sizes of the particular portions of the face are so selected that when the linkage is in the position shown in Fig. 4 the face expresses joy as in Fig. 1, while when the linkage is in the position shown in Fig. 5 said face expresses sorrow as shown in Fig. 2.

The actuating means for the above described animated sign are, in the present embodiment, in the form of a clock mechanism, but it will be understood that any other suitable actuating means such as an electric motor are equally applicable.

The clock mechanism comprises a coil spring 25 wound upon a shaft 26 and transmitting rotative effort through a train of gears mounted on a plurality of shafts to an eccentric shaft 27 secured to the eccentric 13 and rotating the same. A fan blade 28 is mounted on the shaft 29, and it serves as a regulator and inertia member for the clock mechanism, preventing excessively fast rotation thereof during the first period of operation of the tightly wound spring, and permitting desired speed adjustments.

A rotating member 30 is provided underneath the box 11 and it is mounted on a shaft 31 connected by three pairs of bevel gears 32 mounted on suitable journalled shafts to the eccentric shaft 27. On the member 30 there is provided an extension 33 made in the form of a bottle which extension may be ornamented to imitate a beverage bottle of a brand to be advertised. It will of course be obvious that a model of any other product or the product itself may be used instead of the bottle 33. The member 30 may be in the form of a swinging arm or a pan-like member hinged at its center, as shown.

When the member 30 rotates, the model 33 of the article being advertised appears as if in the view of the human figure represented by the animated sign. The position of the member 30 on the shaft 31 is so selected with respect to the position of the linkage that when the bottle appears in view of the observer and in front of the animated sign, the figure of the animated sign expresses joy. In the present embodiment of the invention such an expression is attained by moving the head and hat portion 21 down and relative raising of the upper lip portion 20 to open the mouth of the face as if laughing and also opening the eyes and moving the eye pupils toward the bottle.

As the bottle moves from the left to the right, the eye piece 24 is moved to the left relative to the head portion 21 to cause the eye pupils to follow the bottle. At the same time the upper lip portion 21 moves down closing the mouth of the figure and partly closing the eyes which gives an extremely sad expression to the figure.

By the above described motions an idea is conveyed to the observer that the sight or appearance of the advertised product causes joy in a human being. This idea may be amplified and expressly confirmed by a suitable advertising message which may appear on the animated sign.

In the present embodiment there are provided two messages made up of letters, designated respectively by the numerals 34 and 35. The messages are preferably of the electrically illuminable type and may, if desired, be made similar to electrically operated so-called neon tube signs. The messages are controlled by switches 37 and 38 respectively, which switches are operated by the arm 12 as it moves during the operation of the device. Additional lights 39 and 40 are provided with the aid of which illumination of the figure itself may be changed in any desired manner. Operation of the switches 37 and 38 is illustrated in Figs. 4 and 5 which figures are self-explanatory in this regard.

Thus taken from one of its broader aspects, the present invention contemplates providing an advertising device including an animated sign and having a model of the advertised product movable adjacent said sign, said sign being preferably provided with letter messages, said device having actuating means to operate it smoothly and continuously through a series of predetermined and synchronized movements conveying a desired advertised message.

I claim:

1. In an advertising device, an animated sign representing a human being, said sign including a base having the shoulders and neck portions shown thereon, and a head portion showing the face with the empty eye recesses and the upper teeth without the upper lip, said head portion being adapted to move relative to said shoulders and neck portion, an upper lip portion passing through a slot in said head portion and movable relatively thereto and to said shoulders and neck portion, and an eye piece having eye pupils shown thereon, said eye piece being operatively mounted normally to register with the eye recesses of said head portion and to move both transversely and vertically with respect thereto.

2. In an advertising device, an animated sign having a base portion having shoulders and neck portion of a human being shown thereon, a linkage comprising three spaced vertically extending links and two transverse links hingedly connecting said links together, a fixed pivot for said linkage arranged substantially in the middle of the intermediate link, a portion showing a human face with upper teeth being exposed by removal of the upper lip; and an upper lip portion passed through a slit in said head portion, said face portion being secured to one of the side linkages and said upper lip portion being secured to the intermediate link of said linkage, and means actuating said linkage to move said head portion relative to said shoulder and neck portions, and said upper lip portion relative to said base portion and said face portion, an advertised product adapted to be exposed to observer's view when said upper lip portion moves upwardly and to be concealed when said portion moves downwardly.

3. In an advertising device, an animated sign representing an articulated head comprising a head portion, an upper lip portion, an eye pupil portion, a linkage arranged behind said portions and hinged substantially at its middle, said linkage being adapted to carry said portions, an image of an advertised product adapted to move in front of said head portion and to disappear from view by moving behind the same, and common motor for actuating said linkage and said advertised product.

4. In an advertising device, an animated sign having a base portion having shoulders and neck portions of a human being shown thereon, a linkage comprising three spaced vertically extending links and two transverse links hingedly connecting said links together, a fixed pivot substantially in the middle of the intermediate link, a portion showing a human face with upper teeth being exposed by removal of the upper lip; and an upper lip portion passed through a slit in said head portion, said face portion being secured to one of the side linkages and said upper lip portion being secured to the intermediate link of said linkage, and means actuating said linkage to move said head portion relative to said shoulder and neck portions, and said upper lip portion relative to said base portion and said face portion, a rotatable member adapted to carry an advertised product and, when rotated, alternately to bring said product to view of the observer and to conceal it, a common motor for actuating said linkage and rotating said member.

PHILIP W. SEEWALD.